(12) United States Patent
Wobben

(10) Patent No.: US 7,195,445 B2
(45) Date of Patent: Mar. 27, 2007

(54) WIND ENERGY PARK AROUND A BUILDING TO BE PROTECTED

(76) Inventor: Aloys Wobben, Argestrasse 19, Aurich (DE) 26607

( * ) Notice: Subject to any disclaimer, the term of this patent is extended or adjusted under 35 U.S.C. 154(b) by 127 days.

(21) Appl. No.: 10/493,987

(22) PCT Filed: Oct. 31, 2002

(86) PCT No.: PCT/EP02/12154

§ 371 (c)(1),
(2), (4) Date: Oct. 20, 2004

(87) PCT Pub. No.: WO03/038276

PCT Pub. Date: May 8, 2003

(65) Prior Publication Data

US 2005/0042100 A1   Feb. 24, 2005

(30) Foreign Application Priority Data

Nov. 1, 2001   (DE) ................. 101 53 403

(51) Int. Cl.
*F03D 1/02* (2006.01)
(52) U.S. Cl. ........................ 415/60; 415/118

(58) Field of Classification Search ............ 415/60, 415/118; 416/61, 120
See application file for complete search history.

(56) References Cited

U.S. PATENT DOCUMENTS

| 4,683,691 | A | 8/1987 | Malzahn | 52/167 |
| 6,902,149 | B2* | 6/2005 | Piron | 256/1 |
| 2004/0050014 | A1* | 3/2004 | Lisa et al. | 52/741.3 |
| 2004/0057828 | A1* | 3/2004 | Bosche | 416/1 |

FOREIGN PATENT DOCUMENTS

| DE | 736723 | 6/1943 |
| DE | 742 133 | 11/1943 |
| DE | 29 28 765 | 2/1981 |
| DE | 32 22 943 C3 | 12/1983 |
| DE | 201 18 797 U1 | 2/2002 |
| DE | 200 19 789 U1 | 3/2002 |
| DE | 10150852 A1 * | 5/2003 |

* cited by examiner

*Primary Examiner*—Ninh H. Nguyen
(74) *Attorney, Agent, or Firm*—Seed IP Law Group PLLC

(57) ABSTRACT

The invention concerns a wind park comprising a plurality of wind power installations which are arranged around a building to be protected. The invention provides that a small distance (as small as possible) is provided between the wind power installations and/or the building.

4 Claims, 1 Drawing Sheet

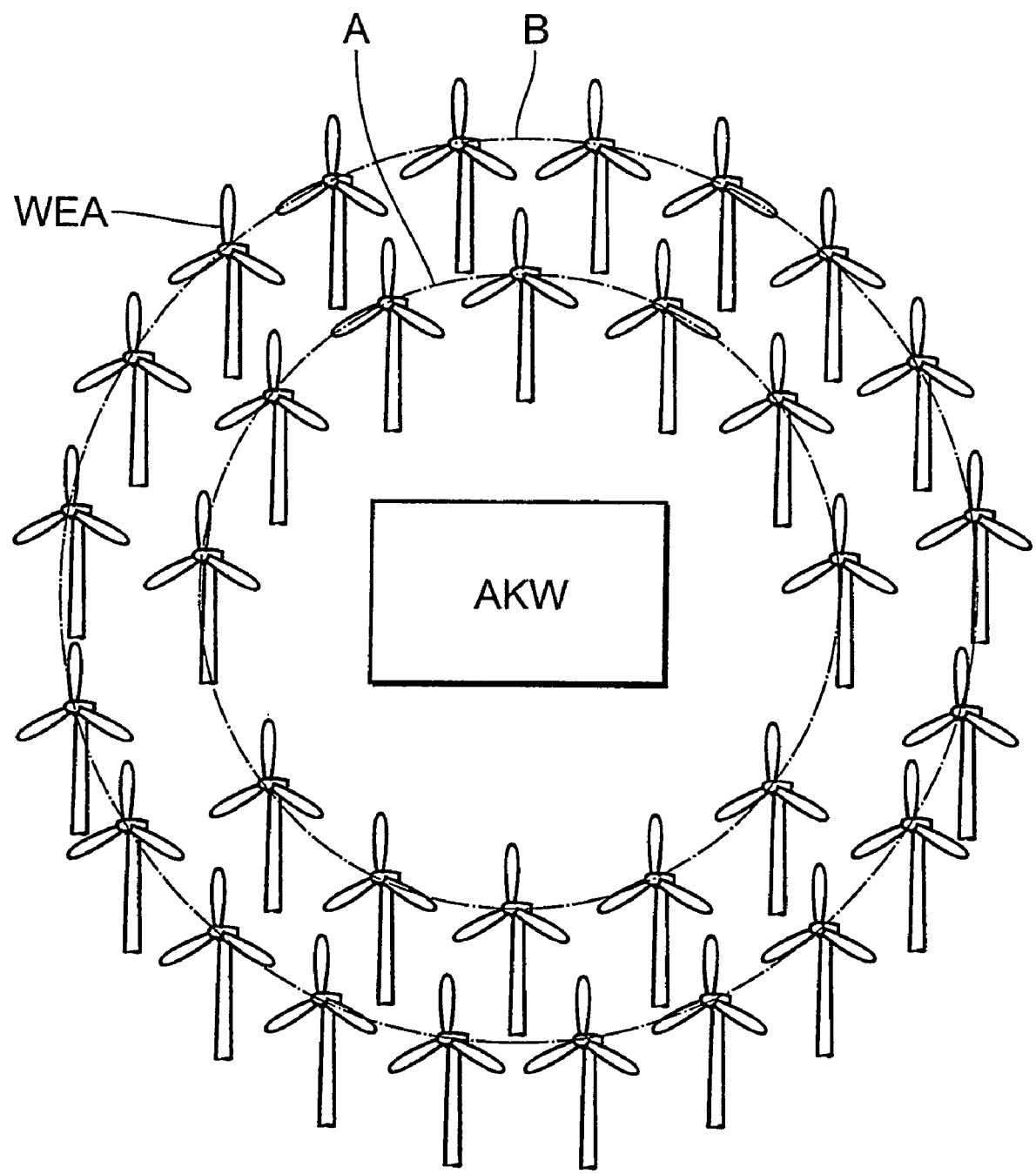

WIND ENERGY PARK AROUND A BUILDING TO BE PROTECTED

FIELD OF THE INVENTION

The invention concerns a wind park.

BACKGROUND OF THE INVENTION

Wind parks comprise a plurality of wind power installations and have already long been known. Such wind parks are usually distinguished in that a plurality of wind power installations are disposed in an energy combine on an area and the electrical energy generated by the wind power installations is preferably fed by way of a common network connection point into the power supply network. In regard to such wind parks moreover attention is also paid to the point that the individual wind power installations are not arranged at an excessively small distance relative to each other so that, in the worst-case scenario, one installation is not disposed directly in the wind shadow of another installation and thus the available wind power supply is only used in a less than optimum fashion.

BRIEF SUMMARY OF THE INVENTION

Now, in accordance with the invention, there is proposed a wind park which does not put the first priority on an optimum wind and energy yield, but on the protection of a building which is within the wind park, for example a nuclear power station.

As the events of Sep. 11, 2001 in New York have demonstrated, high-rise buildings or skyscrapers or other buildings which it is imperative to protect such as for example nuclear power stations are not protected or are only very inadequately protected from airliners crashing into them.

Nuclear power stations are admittedly designed in such a way that even a military aircraft can crash on to them, but a crash of airliners with several tonnes of kerosene on board was hitherto not even considered and thus hitherto also no precautionary measures have yet been taken for adequately protecting nuclear power stations from such a situation. However, adequately protecting nuclear power stations from such a situation, the occurrence of which, on the theory of probability, may admittedly be slight, cannot be excluded, as events have shown.

Nuclear power stations already have a plurality of concrete enclosures which are intended to adequately protect the building in the event of violent force acting thereon from the exterior. However, in the event of the intentional crash of an airliner on such a building, that kind of structural protective measures would not even begin to prevent a total meltdown.

Even shutting down a nuclear power station does not provide any further help here for even a shut-down nuclear power station has a large quantity of radiation potential which would be liberated in the event of the building being forcibly destroyed and would cause a catastrophe of undreamed-of extent.

The invention not only proposes highly effective protection precisely for such buildings as nuclear power stations, but also a measure which can be set up comparatively easily and in comparative terms also at advantageous cost, wherein the particular advantage of the measure according to the invention is also that, besides protection for the building, with a suitable supply of wind, regenerative energy can also be additionally afforded and fed into the network, more specifically even if the nuclear power station has to be taken off the network at some time, for operational reasons.

As nuclear power stations are usually established in a rural area, there is also no particular problem if a wind park is set up around them, especially as the ground around the nuclear power station usually belongs to the nuclear power station operator and the erection of wind power installations there is not thought to encounter particular permission problems.

As moreover a high-power network feed-in means is already present at the location of the nuclear power station, feeding the electrical power from the wind power installations into the network is also possible without any problem and at extremely low equipment costs.

It is particularly clever, in regard to the wind park according to the invention, if the wind power installations of the wind park are arranged as closely together as possible but also in relation to the building to be protected. Under some circumstances that means that the available wind is not put to optimum use. It will be noted however that, by virtue of the arrangement of the wind power installations, the wind park according to the invention serves for the principal purpose of ensuring protection for the nuclear power station building and not for example affording the optimum energy output. It will be appreciated that the distance of the wind power installations relative to each other but also relative to the building will be sufficient that, in any conceivable situation, it is possible to reliably exclude the rotor blades of the wind power installations coming into contact with other wind power installations or the building.

Preferably, the hub height of the wind power installations of the wind park according to the invention is between 80 and 130 m or more and preferably installations of a very high power output are also used, that is to say those installations whose rotor diameter is 40 m or more, preferably 100 m or more.

If now anyone wanted to steer a commercial aircraft towards the nuclear power station and cause it to crash thereon, the pilot would first have to fly over the wind power installations for the mere fact of a commercial aircraft touching the pod of the wind power installation, the pylon of the wind power installation or even the rotor blades of the wind power installation would automatically result in the aircraft exploding so that the explosions causing danger to a building would already take place at a good distance therefrom and would no longer happen directly in or on the building.

As the internal height of nuclear power stations, in particular the reactor buildings, is usually in the range of between 40 and 50 m, then, if for example the spacing of the reactor building in relation to the inner ring of the wind power installations of the wind park is about 100 m, it is in fact no longer possible firstly to fly over the wind power installations from the exterior and then crash the aircraft on the building of the nuclear power station as, because of the high speed, very steep angles of descent and thus controlled steeply descending flight paths are not possible in the case of commercial aircraft.

Particularly preferably, the rotor blades are also provided with camouflage paint so that it is thus virtually impossible for an in-flight approaching pilot to deliberately evade the rotating rotor blades.

If the wind power installations of the wind park are arranged in one, two, three or more notional rings around the nuclear power station building, they can be positioned in such a way that it is also not possible to fly therethrough at the pylon height of the wind power installations.

A particular advantage of the wind park according to the invention is also that the erection of such building protection can be implemented without stopping current operation of the nuclear power station and even if the costs of setting up the wind park should be in the region of 50 millions Euros, that amount is in comparative terms very slight in relation to other structural measures for protecting the nuclear power station, in which respect such structural measures at the present time have not even yet been developed and the development thereof will already cost a multiple of what would be involved in cost terms in erecting a wind park.

In addition however the costs of the wind park can be amortized in that operation of the wind power installations means that current is also fed into the network, and that is paid for, and thus effective protection for the building of the nuclear power station does not have to be expensively bought with a one-off capital investment, but can also be amortized from that point of view after a quite short time.

It is advantageous in regard to the wind park according to the invention if the hub height, that is to say the height of the machine carriers, at which the wind power installation is arranged, is as high as possible, that is to say for example 60 m or more, preferably between 110 and 140 m, which nowadays is readily possible technically (lattice masts, concrete pylons or towers).

If then wind power installations of large type are also used, for example of type E-66 (66 or 70 m rotor diameter) or E-112 (112 m rotor diameter) from ENERCON, the height of the wind power installation in the twelve o'clock position of a rotor blade is readily 150 m or more.

Such large wind power installations of the above-indicated type also have the advantage that the machine housing itself is of a very large mass which under some circumstances is even greater than the total mass of the aircraft that may be flying theretowards, so that a collision between the wind power installation and the aircraft will in any case result in the aircraft exploding and being totally destroyed.

If a commercial aircraft explodes at a distance of between 100 and 250 m from the nuclear power station, many individual parts of the exploding aircraft will possibly still drop on to the building, but under no circumstances can that now still destroy the building as the impact energy of the individual parts is markedly below that for which the reactor building is already designed.

To provide for improved protection of the entire air space around the nuclear power station, it is also possible for some of the wind power installations (or all) of the wind park to be equipped with corresponding radar transmitters so that in that way the air space can also be observed over a large area around the nuclear power station and, in the event that in that way it were found that a commercial aircraft is on a collision course with the nuclear power station building, measures can be appropriately taken in good time.

One of such measures can also involve launching rockets which are arranged at the pylon or on or in the machine carriers of the wind power installation.

A further one of the measures can provide that, when it is found that a commercial aircraft is on a collision course with the nuclear power station, an increased speed of rotation of the rotors is permitted, that is to say a speed of rotation which, in terms of operational management or from safety aspects, is not permitted and is not advantageous for the wind power installation but which increases the probability of the aircraft colliding therewith. Thus, the pilot will not be able to easily distinguish the wind park.

A further measure can also involve deactivating all navigational light arrangements warning lights or comparable measures in the event of detecting a collision course on the part of a commercial aircraft with the nuclear power station building.

In the case of a calm in the wind, one measure can provide that rotor blades (usually three rotor blades to a rotor) are arranged in such a way that they occupy six o'clock, ten o'clock and two o'clock positions. Positioning of the rotor blades in twelve o'clock, four o'clock and eight o'clock positions can also be highly advantageous of particular advantage is alternating the rotor position of adjacent wind power installations on the line of flight towards the building. So, if a first rotor blade is at a position of twelve o'clock, then the wind power installation adjacent to it on a line of flight to the building would have the first rotor blade at six o'clock, and it's other blades at the ten o'clock and two o'clock position, etc.

BRIEF DESCRIPTION OF THE DRAWING

The FIGURE shows a plan view of a design by way of example of a wind park according to the invention.

DETAILED DESCRIPTION OF THE INVENTION

In this case, a plurality of wind power installations WEA are arranged at the smallest possible distance relative to each other in two notional rings A, B around the building AKW to be protected.

A further measure for increasing the degree of protection can also provide that, in crisis situations, that is to say when a corresponding attempt on a nuclear power station is possibly to be expected, the rotors of the wind power installations are caused to rotate by means of current from the power supply network in order in that way to make the whole of the area over which the rotor sweeps available as a protective shield. Alternatively, in such a situation it is then also possible for the respective rotors of the wind power installation to be so oriented that they cover the building to be protected, with a maximum possible area, so that therefore azimuth setting of the machine carriers is effected irrespective of the respective direction of the wind.

So that the active rotation of the rotor can also be effected with electrical power from the power supply network, under some circumstances an inverter has to be provided for that purpose, by means of which energy can be supplied from the power supply network in the correct manner to stator windings of the generator. However, the man skilled in the art will be clear about the measures which he has to take if he is confronted with the task of causing rotation of the rotors of a wind power installation by means of electrical energy from the power supply network.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A wind park, comprising:
a plurality of wind power installations each including a pylon which accommodates a machine carrier and a rotor accommodated thereby of each wind power installation, wherein disposed within the wind park is a high-rise building, a nuclear power station or a comparable building which it is imperative to protect and the wind power installations of the wind park are arranged in at least one notional ring around the high-rise building to be protected and the wind power installations project beyond the building to be protected, wherein a hub height of the wind power installations is 60 m or more, a distance between the building to be protected and the wind power installations of the wind park is about 150–250 m and a rotor diameter of the wind power installations is 40 m or more.

2. The wind park according to claim 1 wherein the wind power installations are arranged in at least two notional rings around the building.

3. The wind park according to claim 1 wherein in the event of a calm in a wind or in the event of stoppage of at least one of the wind power installations, the rotors which have three rotor blades are positioned so that the rotor blades are in six o'clock, ten o'clock and two o'clock positions.

4. The wind park according to claim 1 wherein some of the wind power installations of the wind park are equipped with a radar transmitter, wherein a space, including an air space, around the wind park, is observed for flight movements.

* * * * *